Figure 1:
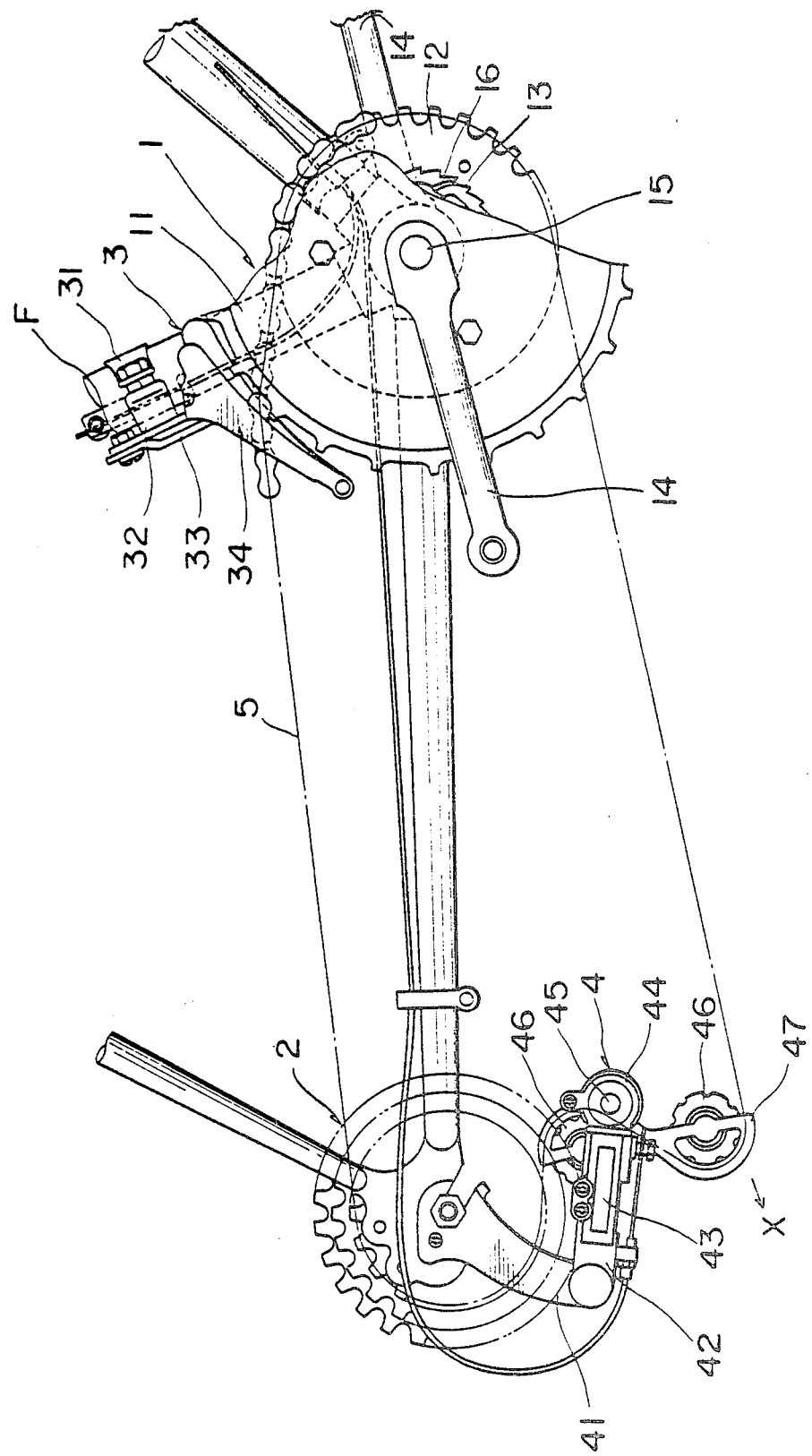

United States Patent [19]

Nagano

[11] 4,154,123
[45] May 15, 1979

[54] DRIVE FOR A BICYCLE

[75] Inventor: Masashi Nagano, Sakai, Japan

[73] Assignee: Shimano Industrial Company, Limited, Osaka, Japan

[21] Appl. No.: 725,576

[22] Filed: Sep. 22, 1976

[30] Foreign Application Priority Data

Sep. 3, 1975 [JP] Japan .............................. 50-107411
Nov. 18, 1975 [JP] Japan .............................. 50-139490

[51] Int. Cl.² ...................... F16H 11/08; F16H 55/30
[52] U.S. Cl. .................................... 74/217 B; 192/64
[58] Field of Search ............. 74/217 B; 280/236, 238, 280/237; 192/6 A, 64

[56] References Cited

U.S. PATENT DOCUMENTS

| | | | |
|---|---|---|---|
| 3,492,883 | 2/1970 | Maeda | 74/217 B |
| 3,709,053 | 1/1973 | Ohshita | 74/243 R |

*Primary Examiner*—Samuel Scott
*Assistant Examiner*—William R. Henderson
*Attorney, Agent, or Firm*—Stevens, Davis, Miller & Mosher

[57] ABSTRACT

A drive for a bicycle provided on the side of its pedals with a freewheel of two or more front chain sprockets, in which the rotational resistance of a rear multiple freewheel in its free rotation is larger than that of the front freewheel in its free rotation so that a driving chain may, even when pedalling is stopped in running of the bicycle, travel across both the front and rear freewheels for changing speed. The drive utilizes a force $F_1$ of an energizing spring for a chain guide cage of a rear derailleur which is respectively larger than a resistance $F_2$ applied to the chain in speed change by a front derailleur, and a rotational resistance $F_3$ of the rear freewheel.

1 Claim, 3 Drawing Figures

DRIVE FOR A BICYCLE

This invention relates to a drive for a bicycle, more particularly to a drive for a bicycle which is adapted to drive a rear wheel by pedalling as the power source, and further to a drive comprising a freewheel of two or more front chain sprockets supported on the side of the pedals of the bicycle, a multiple rear freewheel comprising two or more sprockets supported at the side of the rear wheel, a driving chain stretched across both the front chain sprockets and the rear freewheel, a front derailleur corresponding to the front chain sprockets, and a rear derailleur corresponding to the rear freewheel, so that both derailleurs are adapted to be operable to transmit the driving force from pedalling to the rear wheel to be driven in multistage speed change.

Generally, multistage speed change by the front or rear derailleur is so carried out that its chain guide or guide cage is displaced to shift the driving chain from one sprocket to another. The chain cannot be shifted without travelling across the front sprocket and rear free wheel.

Accordingly, when the freewheel is used as the rear sprocket, cesssation of pedalling on a slope or the like causes the chain to stop thereby making it impossible to change speed.

To solve the above problem, U.S. Pat. No. 3,492,883 proposes that the front sprockets be uni-directionally rotatably supported to a crank shaft through a unidirectional transmission to form a front freewheel and the spring force applied to the pawls of the unidirectional transmission of the multiple sprocket rear freewheel at the side of the rear wheel be larger than the force applied to the unidirectional transmission at the front sprockets so that the freewheels are rotatable together with the bicycle wheel even when pedalling is stopped to allow the chain to travel.

However, when such a drive acts to change the speed, the rear freewheel is actively rotatable and the front freewheel, across which the chain is travelling, is passive so that the chain is, when shifted to one of the front sprockets by operating a front derailleur, brought into contact with the front freewheel. Consequently, the resistance caused by the contact affects the chain travelling so that the chain is not only unable to smoothly mesh with one of front sprockets but is also liable to slacken just before meshing therewith.

As a result, a normal speed change is impracticable and pedalling under the aforesaid condition causes the front sprocket not to be positively driven resulting in the danger of overturning the bicycle because of its imbalance.

The invention has been designed to solve the aforesaid problems of the freewheel. A main object of the invention is to provide a drive for a bicycle in which the driving chain does not slacken when touched with one sprocket of the front freewheel once pedalling has ceased, but is always under tension so as to accurately mesh with the sprocket.

Namely, the drive of the invention utilizes the spring force of a coil spring for urging the chain guide cage. The force is larger than the frictional resistance applied to the chain against the front sprockets in shifting so that the chain tension overcomes the frictional resistance to always carry out normal speed change and the crank shaft is freed from idling caused by slack of the chain.

Figure 2:
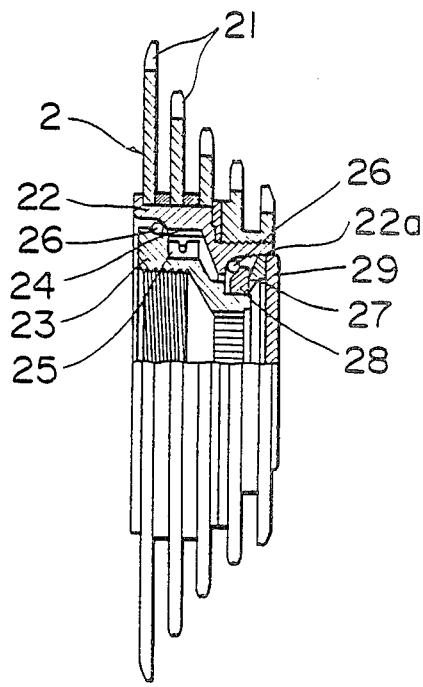
Figure 3:
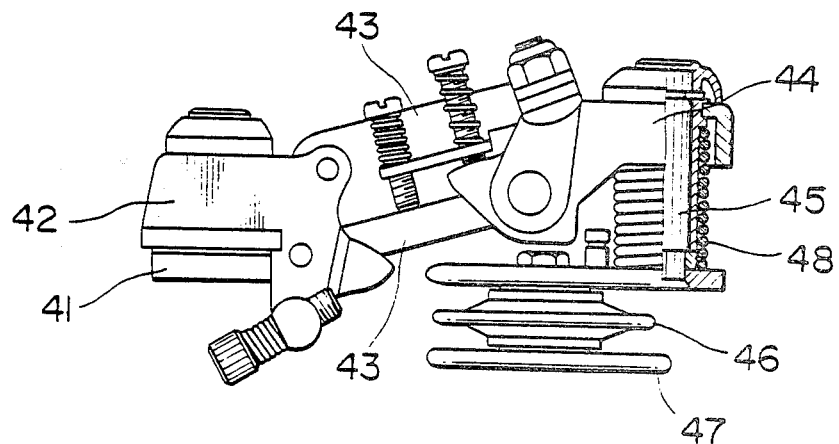

These and other objects, advantages and features of the invention will become more apparent from the following detailed description and examples in the accompanying drawings, in which:

FIG. 1 is a partially broken front view of a front freewheel being fitted to the bicycle frame, FIG. 2 is a partially cutaway side view of a rear freewheel, and FIG. 3 is a partially cutaway bottom plan view of a rear derailleur.

In FIG. 1, is shown a front freewheel 1, a rear freewheel 2, a front derailleur 3, a rear derailleur 4 and a driving chain 5, which make up the drive of the invention.

The front freewheel 1 consists of two of more sprockets. The sprockets 11 and 12 are for high and low speed respectively.

The sprockets 11 and 12 have, at their centers, boss portions which are provided with ratchet teeth 13 at the inner periphery of central bores of the bosses respectively. At the outer periphery of a crank shaft 15 integrated with a pair of crank arms 14 are provided pawls 16 in mesh with the ratchet teeth 13. The pawls and ratchet teeth form a unidirectional transmission. The sprockets 11 and 12 are assembled at the outer periphery of the crank shaft 15 in the relation of being freely rotatable in only one direction, i.e., the forward direction of the bicycle, with respect to the crank shaft 15 through bearings (not shown).

The rear freewheel 2, as shown in FIG. 2, comprises an outer core 22 holding a plurality of sprockets 21 therewith and an inner core 23 screwed with a rear hub (not shown). In greater detail, the outer core 22 has at its inner periphery ratchet teeth 24 and the inner core 23 has at its outer periphery pawls 25 in mesh with the ratchet teeth. The outer core 22 is rotatably supported relative to the outer periphery of the inner core 23, so that a unidirectional transmission is formed by the ratchet teeth 24 and pawls 25. Thus, the well known freewheel is formed in such a manner that the sprockets 21 secured to the outer core 22 can, when rotated in one direction, the bicycle's forward direction, transmit a driving force to the inner core 23. The sprockets 21 can also freely rotate with respect to the inner core when rotated in following the rear wheel.

The rear freewheel 2 further has a resistance-applying means for producing a rotational resistance of the freewheel 2 in its free rotation, i.e., the rotational resistance $F_3$ of the outer core 22 with respect to the inner one 23, larger than that $F_4$ of the front freewheel 1 in its free rotation.

The resistance-applying means is constructed such that a presser 27 made of elastic material, such as a diureide compound, is screwed with thread 22a formed at the outward end of the inner periphery of the outer core 22 and is secured with a tightening nut 29 so that the annular end of the presser 27 abuts against one side of a ball holder 28 for urging the latter inward.

The abutment urging the ball holder 28 at one side thereof with the presser 27 produces the rotational resistance $F_3$, corresponding to the urging force thereof, to the free rotation of the outer core 22 with respect to the inner core 23.

The resistance $F_3$ is set at a given value in excess of the rotational resistance $F_4$ at the front freewheel 1 as aforesaid so that the inner and outer cores 23 and 22 may, when the crank shaft 15 is not rotating during the bicycle's running, be integrally rotatable.

Although, the rotational resistance-applying means is described above as the presser 27, the rotational-resistance applying means could be a link member of a given wire diameter without the bearings 26.

The front derailleur 3 comprises a fixing member 32 secured to the bicycle frame F through a tightening band 31 and a chain guide 34 movably supported to the fixing member 32 through parallel links 33. The chain guide 34 receives the driving chain 5 and therein moves to shift the chain 5 to either the sprocket 11 or the sprocket 12.

In this instance, especially when being shifted from the sprocket 12 for low speed to the sprocket 11 for high speed, the chain 5 tends to touch the lateral side of the high speed sprocket 11 and the inner surface of the chain guide 34 to generate a greater rotational resistance. This resistance is negligible when the crank shaft 15 rotates by pedalling to force the front freewheel 1 to rotate, but acts to forcibly stop the movement of the chain when the rotation of the crank shaft 15 is stopped so as to allow the chain 5 to travel across both the front and rear freewheels through the rear freewheel 2 by means of the rotation of the rear wheel.

Accordingly, it is necessary to make this resistance as small as possible, such as in the range of 1.5 to 2.5 kg. One means for reducing the resistance is to use a return spring (not shown) formed between the links 33 and the fixing member 32 for shifting the chain to the high speed sprocket wheel 11 and another means is to temper the chain guide 34.

The rear derailleur 4 comprises a bracket 41 fixed to the frame F, a fixing member 42 pivoted to the bracket 41, parallel linkage members 43, and a movable member 44 pivoted to the idle ends of the linkage members 43. To the movable member 44 is pivoted a chain guide cage 47 having, as shown in FIG. 3, two chain guide pulleys 46 through a pivot 45. The chain guide cage 47 is energized through a spring 48 in a direction of stretching the chain 5 (the direction of the arrow in FIG. 1).

The chain guide pulleys 46, 46 are meshed with the chain 5, the chain 5 is stretched with a given tension by means of the spring 48, and the movable member 44 moves to guide the chain 5 toward a selected one of the sprocket wheels 21.

The spring 48, as seen from FIG. 3, comprises a coiled spring, one end of which is retained by the guide cage 47 and the other end of which is retained by the movable member 44. The guide cage 47 is energized in the direction of X in FIG. 1, so that the force $F_1$ of the spring 48 may apply a given tension to the chain 5.

In the drive of the invention constructed as aforesaid, the force $F_1$ of the energizing spring 48 at the chain guide cage 47 is larger than the frictional resistance $F_2$, which is minimally reduced by the resistance reducing means, applied to the chain 5 in its shifting by the front derailleur.

In greater detail, making larger the force $F_1$ of the energizing spring 48 means an increase of strain of the chain 5 so that the force $F_1$ made larger than the frictional resistance $F_2$ applied to the chain 5 when shifted, forces the chain 5 to travel, even though it tries to stop, because its strain from the energizing spring 48 exceeds the contact resistance caused by contact of the chain with the front freewheel when the chain is shifted. Therefore, the shifting of the chain 5 by the front derailleur 3 is exact even, if the crank shaft is not rotating, because there is no slack in the chain. The slack of the chain, just before it meshes with the front freewheel 1, is eliminated thereby solving the problem of idling of the crank arm 14.

Incidentally, the force $F_1$ of the spring 48, which is optional, is optimum at about 3kg, and does not need to be larger than 3kg. the resistance $F_2$ is restricted within a range of 1.5 to 2.5 kg.

Furthermore, the force $F_1$ is larger than the rotational resistance $F_3$ of the rear freewheel 2.

When the front derailleur exerts a force $F_2$ in the shifting of chain 5, without pedalling the chain travel slowed by the aforesaid resistance $F_2$ forces immediate free rotation of the rear freewheel. Therefore should the rotational resistance $F_3$ be larger than the force $F_1$ the rear freewheel will certainly rotate integrally with the rear wheel so that the chain will travel but slack in the chain will not be eliminated. However if the rotary resistance $F_3$ is smaller than $F_1$ but larger than $F_2$ the rear free wheel will still rotate integral with the rear wheel but the slack will be eliminated.

As is clearly understood from the abovementioned description, the drive of the invention is adapted to allow both the front and rear gears to be rotatable by the driving force from the rear wheel while the bicycle is in motion, even though the crank shaft is not rotating, thereby making it possible to shaft the chain for the speed change control, and the chain can be prevented from slackening just before it meshes with the front sprocket even if the sprocket is subject to resistance when the bicycle speed is changed. Consequently, the chain can be always accurately shifted to one of the front sprockets and the crank arms can, when re-rotated, be free from idling thereby eliminating the danger caused by the idling thereof.

While an embodiment of the invention has been shown and described, the invention is not limited to the specific construction thereof, which is merely exemplified in the specification rather than defined.

What is claimed is:

1. A drive for a bicycle driven through a rear wheel thereof by pedalling the pedals thereof, said drive comprising:
    a front freewheel comprising two or more sprockets supported on the bicycle adjacent the pedals, said front freewheel having a rotational resistance imparted thereon;
    a rear freewheel carrying two or more sprockets supported on the bicycle adjacent the rear wheel;
    an endless driving chain extending across said front and rear freewheels;
    a front derailleur for said front freewheel, said front derailleur comprising a chain guide for guiding said chain axially of said front freewheel;
    a rear derailleur for said rear freewheel, said rear derailleur comprising:
      two chain guide pulleys meshing with said chain;
      a chain guide cage carrying said guide pulleys to guide said chain axially of said rear freewheel, and
      a spring on said chain guide cage for tensioning said chain, said spring having a spring force which is greater than the resistance imparted to said chain when said chain is shifted to one of the sprockets of said front freewheel by said chain guide of said front derailleur; and
    said rear freewheel comprising an outer core; an inner core within said outer core; a ball holder between said inner and outer core; and a resistance-applying means comprising an elastic member which abuts said ball holder for imparting a rotational resistance to said rear freewheel which is greater than the rotational resistance on said front freewheel so that when pedalling is stopped while the bicycle is moving forward, the rear freewheel is rotatable by rotation of said rear wheel so that said chain can transverse said front and rear freewheels.

* * * * *